UNITED STATES PATENT OFFICE.

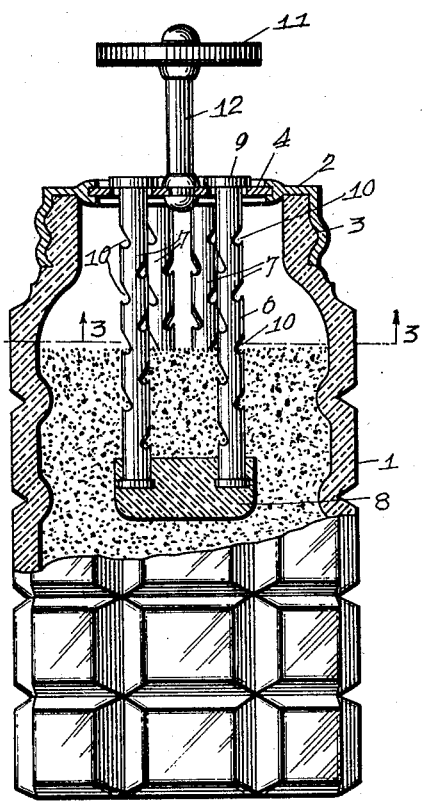
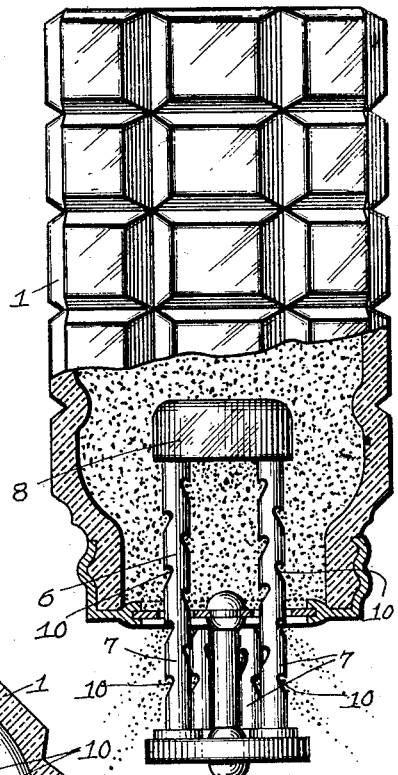
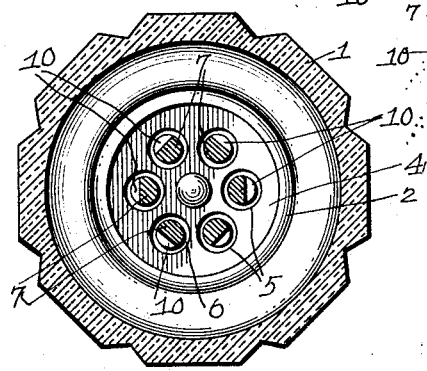

DAVID FREEDLINE, OF BROOKLYN, NEW YORK.

CONDIMENT-HOLDER.

1,389,443.   Specification of Letters Patent.   Patented Aug. 30, 1921.

Application filed September 7, 1920. Serial No. 408,625.

*To all whom it may concern:*

Be it known that I, DAVID FREEDLINE, a citizen of the United States, and a resident of the city of New York, borough of Brooklyn, in the county of Kings and State of New York, have invented a new and Improved Condiment-Holder, of which the following is a full, clear, and exact description.

This invention relates to improvements in condiment holders, and more particularly to an improved dispensing means for the condiment, an object of the invention being to provide a dispensing means which operates as an effective closure for the condiment holder when the latter is in its normal position and which operates to effectually discharge a quantity of the condiment when the holder is inverted and shaken.

It is a well-known fact that condiment, particularly salt, is difficult to remove through the ordinary type of perforated cover when the salt becomes damp, and it is the object of my invention to provide a dispensing means for the condiment holder which will prevent the entrance of moisture into the holder and which will insure an ejection of the condiment when the holder is inverted.

With these and other objects in view the invention consists in certain novel features of construction, and combinations and arrangements of parts as will be more fully hereinafter described and pointed out in the claims.

In the accompanying drawings—

Figure 1 is a view partly in elevation, but mainly in vertical longitudinal section through a condiment holder illustrating my invention.

Fig. 2 is a view similar to Fig. 1, showing the parts in inverted position.

Fig. 3 is a view in transverse section on the line 3—3 of Fig. 1.

1 represents a condiment holder which may be of any desired shape, material, and ornamented in any approved manner, and 2 is a cap or cover which may be screwed or otherwise secured on the open upper end of the holder 1 as shown at 3. This cap 2 is provided with a disk 4 which is made with perforations 5 for the escape of the condiment. This cap or cover 2 may be made in any desired form and of any desired material and is preferably of a material which will resist the action of the condiment.

6 represents my improved ejector which consists of a plurality of parallel rods 7 longitudinally positioned and projecting through the openings or perforations 5. These rods are connected at their lower ends by an agitator 8 which constitutes a weight which operates to break up lumps of condiment, and also to limit the movement outwardly of the rods 7.

The rods 7 at their outer ends are made with heads 9 which are of larger diameter than the diameter of the openings or perforations 5 so that when the condiment holder is in upright normal position, these heads will operate as closures for the openings or perforations and prevent moisture or moisture-laden air from entering the condiment holder.

The rods 7 forming the ejector 6 are provided with pockets 10 which are made by forming recesses in the rods and these recesses are angularly disposed relative to the longitudinal plane of the rods, so that they operate as receptacles to carry with them a quantity of the condiment when they move longitudinally through the openings or perforations 5 when the condiment holder is inverted as shown in Fig. 2.

With respect to the longitudinal movement of the ejector 6 I provide a disk 11 which is secured to the outer end of a post 12 fixed to the cap or cover 2, and this disk 11 may be of any suitable material, and which operates to arrest the outward movement of the rods 7, whereby this arrest causes the condiment to be thrown out of the pockets 10.

It will, therefore, be noted that my improved ejector operates as an effective closure for the cap to prevent the entrance of moisture or moisture-laden air into the condiment holder and also functions as a positive ejecting means and serves to maintain the perforations free from particles of the condiment which would clog the same.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. The combination with a condiment holder, and a perforated cover thereon, of an ejector comprising rods located in the perforations of the cover, said rods having a staggered arrangement of condiment receiving pockets therein, an agitator secured to the inner ends of the rods and constituting a weight, and a disk spaced above the cover and limiting the outward movement of the ejector.

2. The combination with a condiment holder, and a perforated cover thereon, of an ejector comprising rods located in the perforations of the cover, said rods having pockets therein, heads on the rods closing the perforations when the condiment holder is in upright position, an agitator secured to the inner ends of the rods and constituting a weight, a post fixed to the cover, and means on the post limiting the outward movement of the ejector.

3. The combination with a condiment holder, and a perforated cap thereon, of a post on the cap, a disk at the outer end of the post, an ejector comprising a series of rods located in the perforations and having heads at their outer ends adapted to close the perforations, an agitator at the inner ends of the rods connecting the same, and said disk operating to limit the outward movement of the ejector.

DAVID FREEDLINE.